Oct. 27, 1942.  F. J. WESTROPE  2,299,775
SLIDABLE VISOR
Filed July 3, 1941
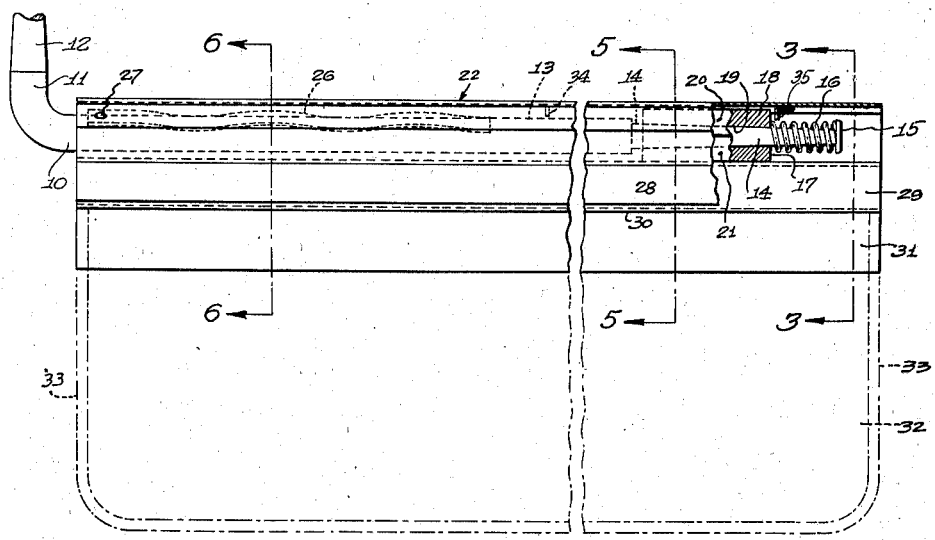
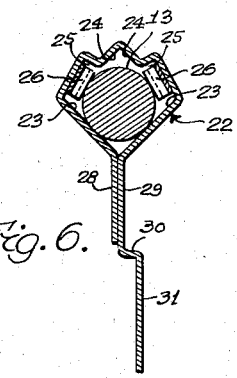 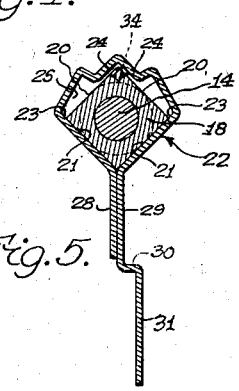 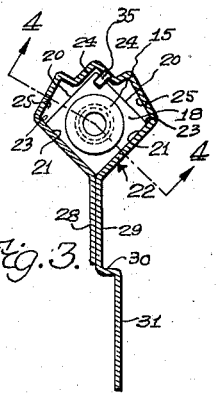
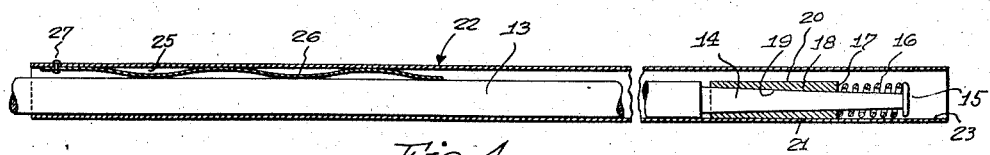
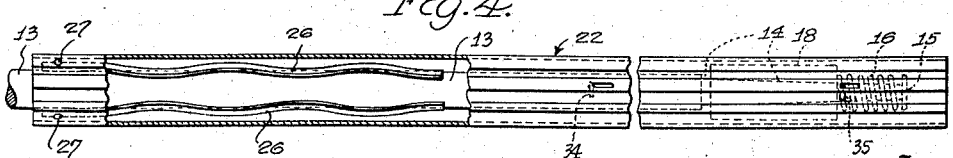
Inventor
Frederick J. Westrope
By
Attorneys Patented Oct. 27, 1942

2,299,775

UNITED STATES PATENT OFFICE 2,299,775

SLIDABLE VISOR

Frederick J. Westrope, Pleasant Ridge, Mich., assignor, by mesne assignments, to Reconstruction Finance Corporation, Detroit, Mich., a corporation of the United States Application July 3, 1941, Serial No. 400,897

12 Claims. (Cl. 296—97)

This invention relates to visors or glareshields, and more particularly to visors for motor vehicles.

One object of the present invention is to provide a visor which is swingable around a supporting rod and slidable longitudinally along the rod, together with means for retaining the visor in any desired position of adjustment.

Another object is to provide a visor as set forth in the preceding object wherein the retaining means is enclosed within the visor tube and frictionally engages the visor supporting rod.

Another object is to provide a visor as set forth in the preceding objects wherein the end of the visor supporting rod is provided with a conical taper engaged by an externally squared block having an internal conical bore, the visor supporting tube being correspondingly squared internally to receive the squared block, so that the mating conical surfaces provide a frictional holding and retaining device for adjustably swinging the visor around the visor supporting rod and the mutual engagement of the squared block and visor supporting tube provides for coupling these together, yet permitting the tube to slide longitudinally along the block and rod.

Another object is to provide a visor having a visor supporting rod encircled by a visor supporting tube which is longitudinally flattened and engaged internally by a longitudinally flattened block which has an internal conical bore frictionally engaging an external conical taper on the end of the rod, springs being provided for urging the tapered surfaces into frictional engagement and also for frictionally holding the visor supporting tube in any position of adjustment along the rod.

In the drawing:

Figure 1 is a side elevation of a preferred embodiment of the slidable visor of this invention, with the right-hand end broken away and in longitudinal section.

Figure 2 is a top plan view of the slidable visor shown in Figure 1 with the left-hand end broken away to disclose the longitudinal friction springs.

Figure 3 is a cross section along the line 3—3 in Figure 1.

Figure 4 is a longitudinal section along the line 4—4 in Figure 3.

Figure 5 is a cross section along the line 5—5 in Figure 1.

Figure 6 is a cross section along the line 6—6 in Figure 1.

In general, the slidable visor of this invention consists of a visor-supporting rod having a conically tapered end mating with a correspondingly tapered internal bore in an externally squared block, these two elements being urged into frictional engagement by a coil spring. Surrounding the visor-supporting rod and engaging the squared block is a correspondingly squared visor supporting tube having the visor panel connected thereto and carrying elongated undulating leaf springs for frictionally holding the visor in its adjusted position along the rod. The mutual engagement of the externally squared block with the internally squared visor supporting tube provides a coupling between them whereby the swinging of the visor around its rod also swings the blocks and provides a frictional holding effect between the mating conical surfaces. At the same time, however, the tube may be slid longitudinally along the block and rod and held in its longitudinally adjusted position by the undulating leaf springs.

Referring to the drawing in detail, Figure 1 shows a preferred embodiment of the slidable visor of this invention as consisting of a visor-supporting rod 10 having a bent and end portion 11 with a taper 12 thereon for attachment to a bracket which in turn is secured to the inside of the body top or windshield header as is well known to those skilled in the art. The elongated portion 13 of the visor supporting rod is of circular cross section and terminates in a conically tapered portion 14 having a head 15 on the end thereof. Surrounding the tapered portion 14 adjacent the head 15 is a coil spring 16, one end of which engages the head 15 and the other end the end wall 17 of a block 18 having an internal conical bore 19 corresponding in taper to the tapered rod portion 14 and mating therewith. The outer portion of the block 18 is longitudinally squared—that is, the block is provided with upper and lower flat surfaces 20 and 21 respectively extending lengthwise thereof.

Surrounding the rod portion 13 and the block 18 is a visor-supporting tube 22 having internally flattened surfaces 23 engaged by the lower flattened surfaces 21 of the block 18. The tube 22 is of approximately squared cross section and has upper flattened surfaces 24 which engage the upper flattened surfaces 20 of the block 18 (Figure 5).

Immediately below the flattened surfaces 24, the tube 22 is provided with longitudinally extending pockets 25 serving as receiving chambers for a pair of longitudinally extending undulating leaf springs 26 (Figures 2, 4 and 6). The springs 26 are secured as at 27 to the tube 22 and extend lengthwise of and inside the tube 22 frictionally engaging the rod portion 13 at a plurality of locations.

The visor supporting tube 22 is formed from a single piece of sheet material and is provided with downwardly-extending flange portions 28 and 29 which are secured to one another as by welding. The flange portion 29 is provided with an offset portion 30 continuing in a flanged extension 31 (Figures 3, 5 and 6) to which a visor panel 32 is secured, as by riveting, stapling, or the like. The visor panel 32 may be provided with an edge frame 33 of U-shaped form (Figure 1) serving to enclose the visor panel 32 and provide a durable edge therefor. The visor frame 33 and panel 32 may then be covered with cloth or any other suitable finishing material.

The visor supporting tube 22 and rod portion 13 are provided with stops 34 and 35 respectively whereby the sliding of the visor tube 22 along the rod portion 13 is limited. The purpose of these stops 34 and 35 is to provide means for preventing the visor tube 22 from being drawn completely off the end of the rod portion 13. A suitable stop consists, for example, in punching a tab 35, from the tube 22 adjacent the end of the block 18 and extending inwardly at right angles to the tube. The stop 35 prevents the tube 22 from being pushed too far to the left against the bent portion 11 of the rod 10. A similarly constructed stop 34 (Figure 1) similarly prevents the tube 22 from being moved too far to the right.

In operation, the parts are assembled and the stop tabs 34 and 35 bent downwardly and inwardly into their permanent positions, thus locking the parts together. The external tapered portion 12 of the rod 10 is mounted in a bracket which is secured to the interior of the vehicle body in the usual way. To adjust the position of the visor panel 32 angularly, the operator grasps it and swings it around the axis of the rod portion 13. The coupling of the visor tube 22 and block 18 through their flattened surfaces causes the block 18 to be rotated around the axis of the rod portion 13, overcoming the friction between the mutually engaging conical curfaces 14 and 19. When the visor panel 32 is released, however, the coil spring 16 immediately urges the block 18 into frictional engagement with the taper 14, releasably holding the panel 32 in its adjusted position.

The panel 32 may also be adjusted longitudinally along the rod portion 13 merely by sliding it lengthwise thereof. When this occurs, the tube 22 is moved along the rod portion 13 and block 18. When the operator releases the panel 32 at the desired point of adjustment, the undulating leaf springs 26 frictionally engage the rod portion 13 and prevent dislodgement.

While a specific embodiment of the invention has been described and illustrated, it will be understood that various modifications may be made within the scope of the appended claims without departing from the spirit of the invention.

What I claim is:

1. In a slidable visor, a visor-supporting rod having a tapered portion, an adjustment member having a tapered bore frictionally engaging said tapered portion and having longitudinally-extending surfaces disposed at an angle to one another, a visor-supporting tube disposed externally of said rod and having longitudinally-extending surfaces corresponding in configuration to said previously mentioned longitudinally-extending surfaces and in engagement therewith, and a visor panel structure connected to said visor-supporting tube.

2. In a slidable visor, a visor-supporting rod having a tapered portion, an adjustment member having a tapered bore frictionally engaging said tapered portion and having a non-circular cross section of substantially constant size longitudinally thereof, a visor-supporting tube of non-circular cross section disposed externally of said rod and in coupling engagement with said adjustment member and slidable therealong, and a visor panel structure connected to said visor-supporting tube.

3. In a slidable visor, a visor-supporting rod having a tapered portion, an adjustment member having a tapered bore frictionally engaging said tapered portion, said adjustment member having a longitudinally-flattened portion therealong, a visor-supporting tube disposed externally of said rod and having a longitudinally-flattened portion slidably engaging said adjustment member flattened portion, and a visor panel structure connected to said visor-supporting tube.

4. In a slidable visor, a visor-supporting rod having a tapered portion, an adjustment member having a tapered bore frictionally engaging said tapered portion, a visor-supporting tube disposed externally of said rod, coupling means arranged between said tube and said adjustment member for coupling the same together for simultaneous rotational movement around said rod and for independent sliding motion along said rod, and a visor panel structure connected to said visor-supporting tube.

5. In a slidable visor, a visor-supporting rod having a tapered portion, an adjustment member having a tapered bore frictionally engaging said tapered portion, a visor-supporting tube disposed externally of said rod, said tube and said adjustment member having longitudinally-extended relatively slidable portions of different configuration than the remainder thereof, whereby to couple the same together for simultaneous rotation while permitting independent longitudinal sliding motion, and a visor panel structure connected to said visor-supporting tube.

6. In a slidable visor, a visor-supporting rod having a tapered portion, an adjustment member having a tapered bore frictionally engaging said tapered portion, a visor-supporting tube disposed externally of said rod, said tube and said adjustment member having mutually engaging longitudinally-extending flattened portions whereby to couple the same together for simultaneous rotation while permitting independent longitudinal sliding motion, and a visor panel structure connected to said visor-supporting tube.

7. In a slidable visor, a visor-supporting rod having a tapered portion, an adjustment member having a tapered bore frictionally engaging said tapered portion, a visor-supporting tube disposed externally of said rod, said tube and said adjustment member having mutually engaging longitudinally-extending portions of at least partially squared cross sections whereby to couple the same together for simultaneous rotation while permitting independent longitudinal sliding motion, and a visor panel structure connected to said visor supporting tube.

8. In a slidable visor, a visor-supporting rod having a tapered portion, an adjustment member having a tapered bore frictionally engaging said tapered portion, a visor-supporting tube disposed externally of said rod, said tube and said adjustment member having mutually engaging longitudinally-extending portions of at least partially squared cross sections whereby to couple the same together for simultaneous rotation while permitting independent longitudinal sliding motion, a visor panel structure connected to said visor supporting tube, said visor supporting tube having an offset longitudinally-extending portion providing an elongated chamber therein, and an elongated spring in said chamber frictionally engaging said rod.

9. In a slidable visor, a visor-supporting rod having a tapered portion, an adjustment member having a tapered bore frictionally engaging said tapered portion, a visor-supporting tube disposed externally of said rod, coupling means arranged between said tube and said adjustment member for coupling the same together for simultaneous rotational movement around said rod and for independent sliding motion along said rod, a visor panel structure connected to said visor-supporting tube, and yielding means for urging said adjustment member into frictional engagement with said rod.

10. In a slidable visor, a visor-supporting rod having a conically tapered end, an adjustment member of at least partially rectangular cross section having an internal conical bore mating with and frictionally engaging said end, a visor-supporting tube having an internal portion of at least partially rectangular cross section slidably engaging said adjustment member, and a visor panel structure connected to said tube.

11. In a slidable visor, a visor-supporting rod having a conically tapered end, an adjustment member of at least partially rectangular cross section having an internal conical bore mating with and frictionally engaging said end, a visor-supporting tube having an internal portion of at least partially rectangular cross section slidably engaging said adjustment member, a visor panel structure connected to said tube, said tube having a longitudinally-extending internal recess therein, and elongated spring means within said recess and frictionally engaging said rod.

12. In a slidable visor, a visor-supporting rod having a conicaly tapered end, an adjustment member of at least partially rectangular cross section having an internal conical bore mating with and frictionally engaging said end, a visor-supporting tube having an internal portion of at least partially rectangular cross section slidably engaging said adjustment member, a visor panel structure connected to said tube, said tube having a longitudinally-extending internal recess therein, elongated spring means within said recess and frictionally engaging said rod, and additional spring means for urging said adjustment member into frictional engagement with said rod.

FREDERICK J. WESTROPE.